United States Patent
Fujii et al.

(10) Patent No.: US 6,467,296 B2
(45) Date of Patent: Oct. 22, 2002

(54) AIR CONDITIONING SYSTEM FOR VEHICLE

(75) Inventors: Toshiro Fujii; Kazuo Murakami; Yoshiyuki Nakane; Tatsuya Koide, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/768,522

(22) Filed: Jan. 24, 2001

(65) Prior Publication Data

US 2001/0025509 A1 Oct. 4, 2001

(30) Foreign Application Priority Data

Jan. 25, 2000 (JP) ........................ 2000-016074

(51) Int. Cl.$^7$ ............................. F25B 13/00; F04B 1/12; F04B 17/04; F04B 35/04
(52) U.S. Cl. .................. 62/324.6; 62/160; 417/269; 417/357
(58) Field of Search ............................ 62/324.1, 324.6, 62/160; 417/269, 357

(56) References Cited

U.S. PATENT DOCUMENTS 5,931,645 A * 8/1999 Goto et al. ................ 417/269
6,079,218 A * 6/2000 Ueda .......................... 62/160

FOREIGN PATENT DOCUMENTS

| DE | 33 13 407 A1 | 10/1983 | ............ B60H/3/00 |
| DE | 198 13 674 C1 | 4/1999 | ............ B60H/1/00 |
| GB | 2 118 713 A | 11/1983 | ............ B60H/1/22 |
| JP | 48-82412 | 11/1973 | |
| JP | 5-187356 | 7/1993 | ............ F04B/27/08 |
| JP | 10-184539 | 7/1998 | ............ F04B/27/08 |
| JP | 2000-052753 | 2/2000 | ............ B60H/1/32 |

\* cited by examiner

Primary Examiner—William C. Doerrler
(74) Attorney, Agent, or Firm—Morgan & Finnegan, LLP (57) ABSTRACT

An air conditioning apparatus for a vehicle that includes a multi-stage compressor, an internal heat exchanger, an external heat exchanger, a heat exchanger switching circuit, a cooling expansion passage and a heating expansion passage. The compressor has at least two cylinder bores, one bore being smaller than the other. Refrigerant is compressed in two stages. Refrigerant is conducted from the large cylinder bore to the small cylinder bore via an intermediate chamber. The heat exchanger switching circuit connects the intake chamber of the compressor to one of the heat exchangers depending on whether heating or cooling is desired.

8 Claims, 5 Drawing Sheets

AIR CONDITIONING SYSTEM FOR VEHICLE

BACKGROUND OF THE INVENTION

This invention relates to vehicle air conditioning systems and, more particularly, to a vehicle air conditioning system that performs cooling and heating, and a compressor.

In order to solve environmental problems, it has been proposed to employ a substitute for fluorocarbon in vehicle air conditioning systems. For example, carbon dioxide may be employed as a refrigerant to achieve cooling or heating. In addition, there is a need for a small air conditioning system.

Piston type compressors have been widely used in automotive air conditioning systems. Such compressors have a dead volume relative to the volume of the piston stroke, and refrigerant remaining in the dead volume is subjected to re-compression, which reduces the volumetric efficiency. The dead volume tends to increase as the capacity of the compressor decreases and, consequently, it is difficult to provide a small compressor that is efficient.

Further, in order to achieve cooling and heating, the compressor is required to have a compression ratio that varies in a considerably wide range. Under a circumstance in which a high compression ratio is required and the intake pressure is low, such as the beginning of the winter season, that is, when the intake refrigerant has in low density, the power per unit of exhaust volume, or the heating capacity, decreases and the compressor must be operated at a high rotational speed. To increase the air heating performance without increasing the rotational speed of the electric motor, the exhaust volume of the compressor must be increased. To increase the rotational speed of the electric motor, it is required to employ an electric motor having a high rotational speed. To increase the exhaust volume of the compressor, it is required to employ an electric motor that has a large output torque and a high performance inverter unit. This increases the size of the compressor and the manufacturing cost.

SUMMARY OF THE INVENTION

It is an object of the present invention to provide a vehicle air conditioning system that is compact, highly efficient for cooling and heating, and low in cost.

To achieve the above and other objects, in a first aspect, the present invention is an air conditioning apparatus used for selectively heating and cooling a passenger compartment of a vehicle.

The air conditioning apparatus includes a compressor, a cooling circuit and a heating circuit.

The compressor includes a suction chamber into which refrigerant is drawn from outside the compressor, a discharge chamber for discharging refrigerant from the compressor, a first compression chamber, in which a first stage of compression is performed, a second compression chamber, in which a second stage of compression is performed, wherein the second stage is subsequent to the first stage, an intermediate chamber for connecting the first compression chamber to the second compression chamber, such that refrigerant discharged from the first compression chamber is led to the second compression chamber by the intermediate chamber. A cooling circuit is connected to the compressor, wherein the cooling circuit is used for cooling the passenger compartment. A heating circuit is connected to the compressor, wherein the heating circuit is used for heating the passenger compartment.

To achieve the above and other objects, in a second aspect, the present invention is an air conditioning apparatus for a vehicle, wherein the apparatus includes a compressor, an internal heat exchanger, an external heat exchanger and a heat exchanger change-over circuit.

The compressor includes a first cylinder bore, a second cylinder bore, wherein the second cylinder bore is smaller in diameter than the first cylinder bore, a first piston located in the first cylinder bore, a second piston located in the second cylinder bore, an intermediate chamber connecting the first and second cylinder bores to one another, an intake chamber connected to the first cylinder bore, an exhaust chamber connected to the second cylinder bore, a drive mechanism for driving the first and second pistons, a first intake valve for conducting refrigerant from the intake chamber to the first cylinder bore, a first discharge valve for conducting refrigerant from the first cylinder bore to the intermediate chamber, a second intake valve for conducting refrigerant from the intermediate chamber to the second cylinder bore, a second discharge valve for conducting refrigerant from the second cylinder bore to the exhaust chamber.

The internal heat exchanger locates in a passenger compartment of the vehicle, wherein the internal heat exchanger has first and second ends, an external heat exchanger located outside the passenger compartment, wherein the external heat exchanger has first and second ends.

The heat exchanger change-over circuit includes a cooling passage, by which the intake chamber of the compressor is connected to the first end of the internal heat exchanger and by which the exhaust chamber is connected to the first end of the external heat exchanger and a heating passage, by which the exhaust chamber of the compressor is connected to the first end of the internal heat exchanger and by which the intake chamber is connected to the first end of the external heat exchanger, wherein the cooling passage is blocked and the heating passage is open during a heating operation, and the heating passage is blocked and the cooling passage is open during a cooling operation.

The expansion valve change-over circuit includes a heating expansion passage to expand refrigerant flowing from the internal heat exchanger and a cooling expansion passage to expand refrigerant flowing from the external heat exchanger, wherein the heating expansion passage is open and the cooling expansion passage is closed during the heating operation, and the cooling expansion passage is open and the heating expansion passage is closed during the cooling operation.

Other aspect and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
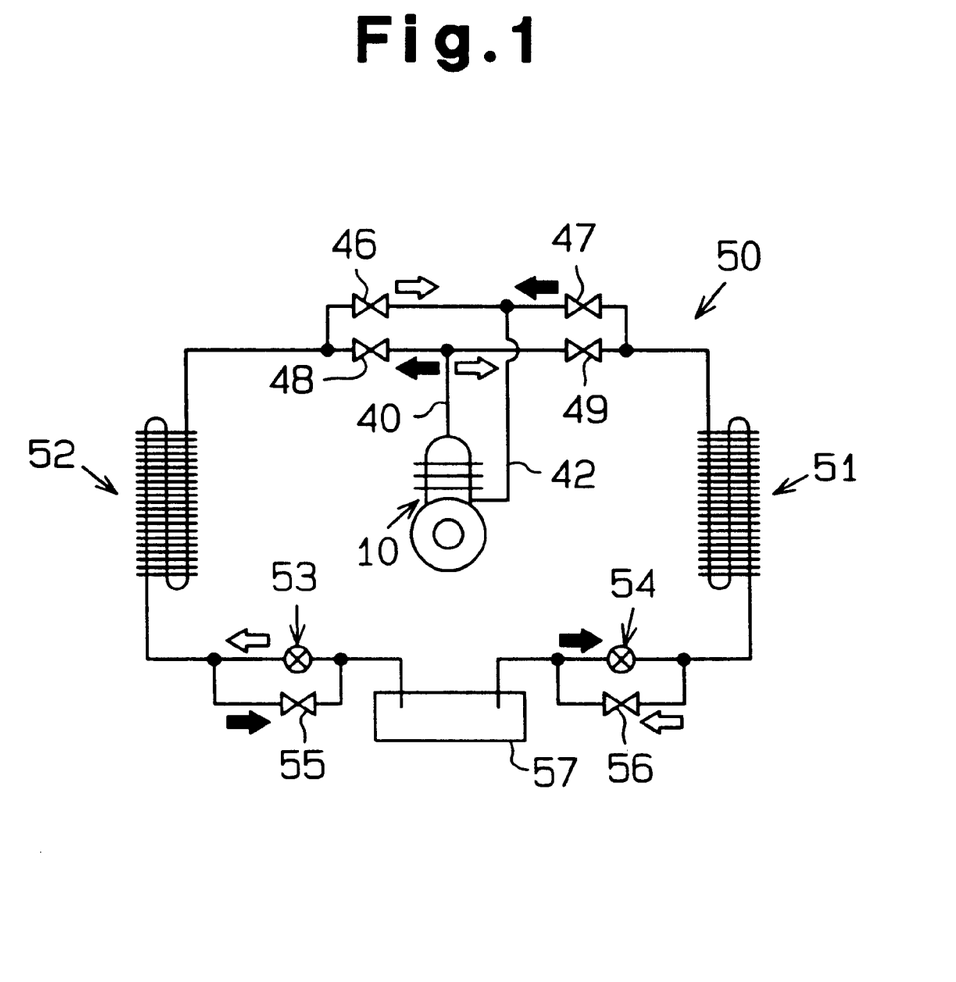
FIG. 1 is a schematic view of a preferred embodiment of a vehicular air conditioning system according to the present invention.

Referring now to the drawings, FIG. 1 shows a preferred embodiment of an air conditioning system according to the present invention. The air conditioning system employs carbon dioxide as refrigerant and is suited for use in vehicles.

The air conditioning system cools or heats air in a passenger compartment of the vehicle.

As shown in FIG. 1, the air conditioning system 50 includes first and second heat exchangers 51,52. The first heat exchanger 51 is located in the passenger compartment of the automotive vehicle in which the air conditioning system is installed. The second heat exchanger 52 is located in an engine room of the vehicle together with a compressor 10, a reservoir 57 and first and second expansion valves 53,54. In the preferred embodiment, the first heat exchanger 51 will be referred to as an internal air conditioning coil, and the second heat exchanger 52 will be referred to as an external air conditioning coil.

The compressor 10 is a swash type multi-stage compressor. The compressor 10 is connected with first refrigerant ports of the internal and external air conditioning coils 51,52 through a heat exchanger changer-over circuit that includes first and second conduits 40,42 and valves 46 to 49. A second refrigerant port of the internal air conditioning coil 51 is connected with a first port of the reservoir 57 via the second expansion valve 54. A second refrigerant port of the external air conditioning coil 52 is connected with a second port of the reservoir 57 via the first expansion valve 53. First and second change-over valves 55,56 form part of first and second by-pass circuits, respectively. The first and second change-over circuits cause the first and second expansion valves 53,54 to be bypassed depending on the state of the first and second change-over circuits.

When cooling the passenger compartment, the valves 47,48,55 are opened, and the valves 46,49,56 are closed. Compressed refrigerant from the compressor 10 circulates through a first conduit 40, the valve 48, the external coil 52, the first change-over valve 55, the reservoir 57, the second expansion valve 54, the internal coil 51, the valve 47 and a second conduit 42 to the compressor 10, as shown by a solid black arrow.

When heating the passenger compartment, the valves 47,48,55 are closed, and the valves 46,49,56 are opened. Compressed refrigerant from the compressor 10 circulates through a first conduit 40, the valve 49, the internal coil 51, the second change-over valve 56, the reservoir 57, the first expansion valve 53, the external coil 52, the valve 46 and the second conduit 42 to the compressor 10, as shown by a white arrow.

Figure 2:
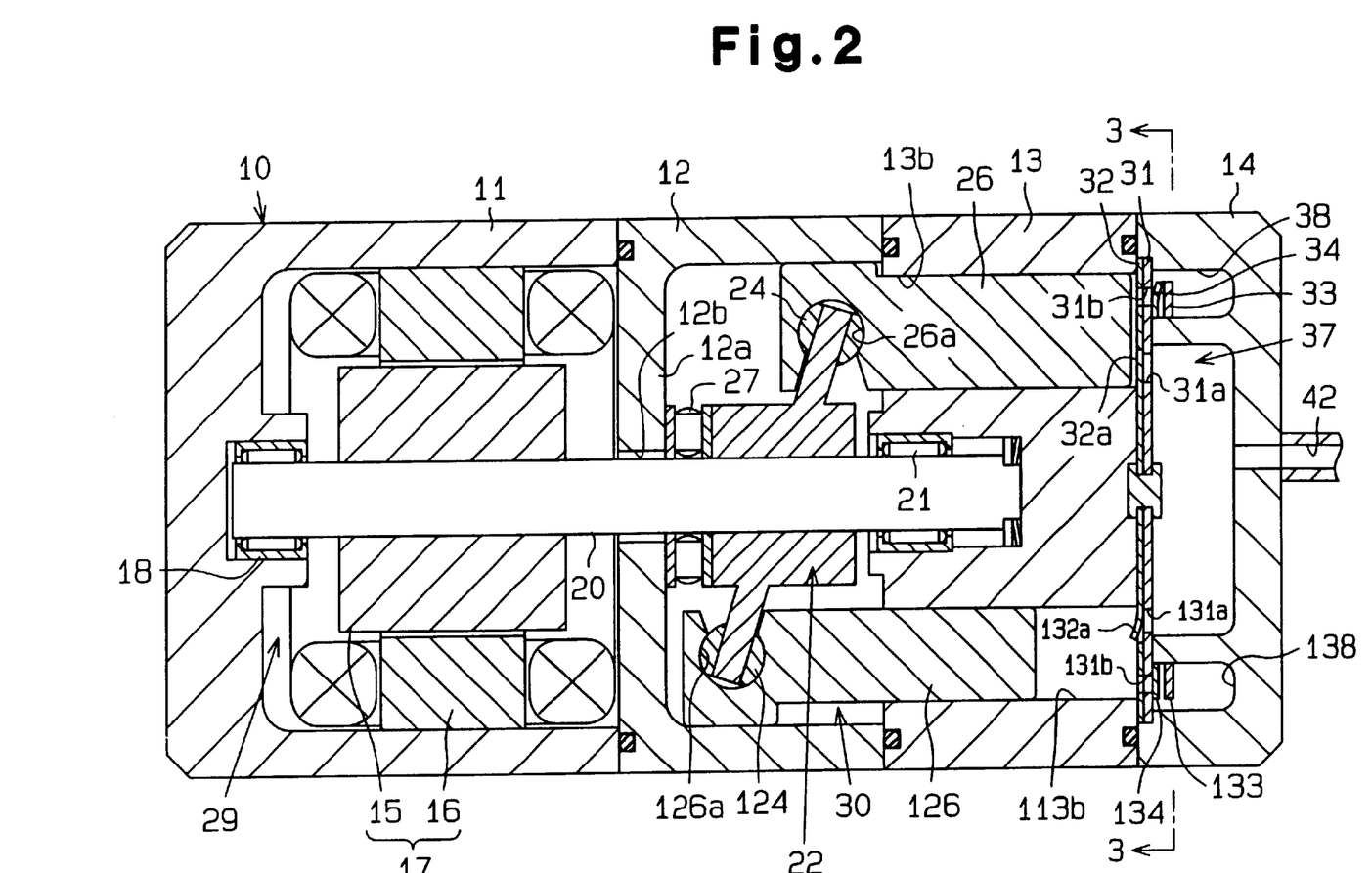
FIG. 2 is a cross sectional view of a preferred embodiment of a compressor shown in FIG. 1.
Figure 3:
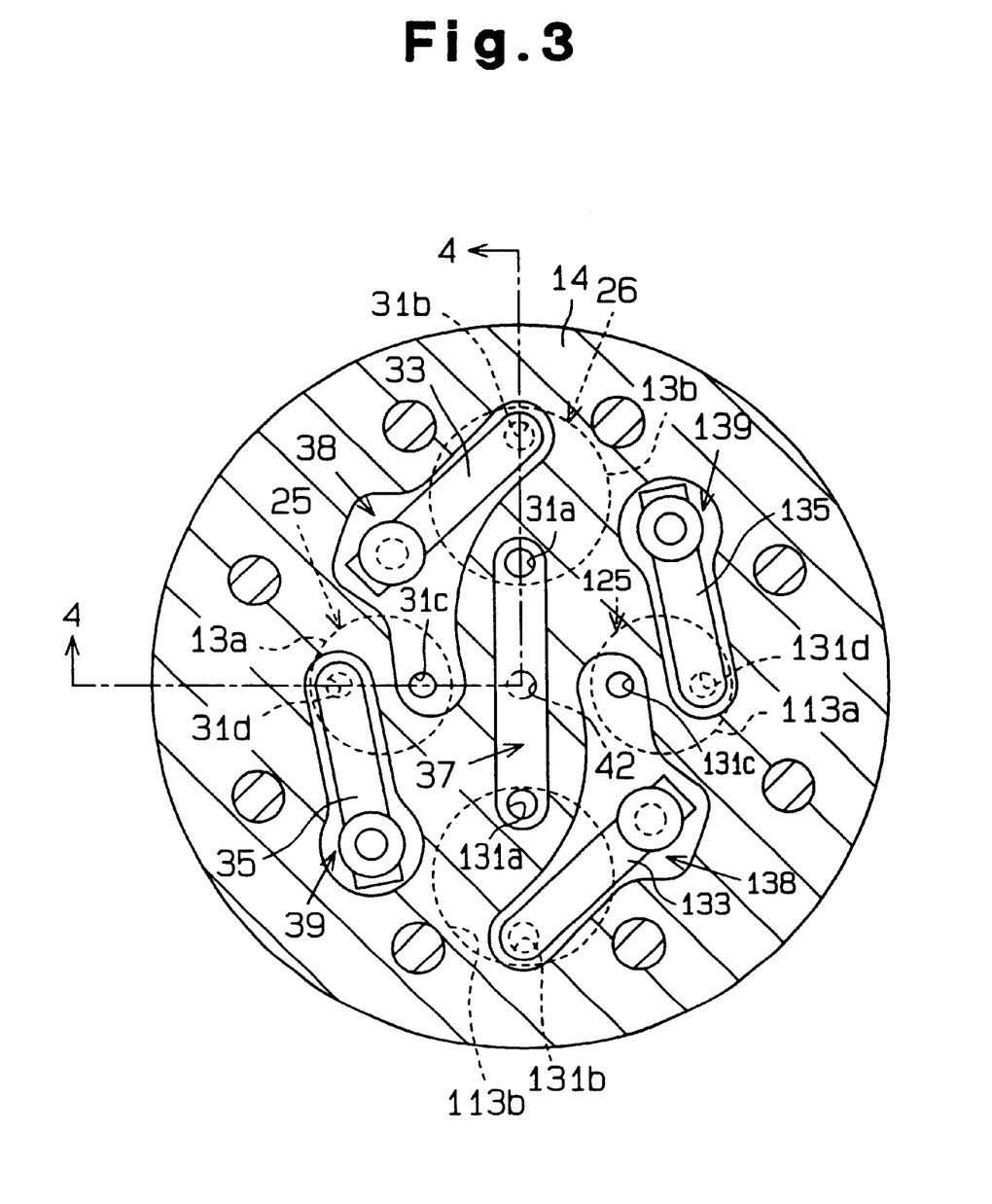
FIG. 3 is a cross sectional view taken along line 3—3 of FIG. 1.
Figure 4:
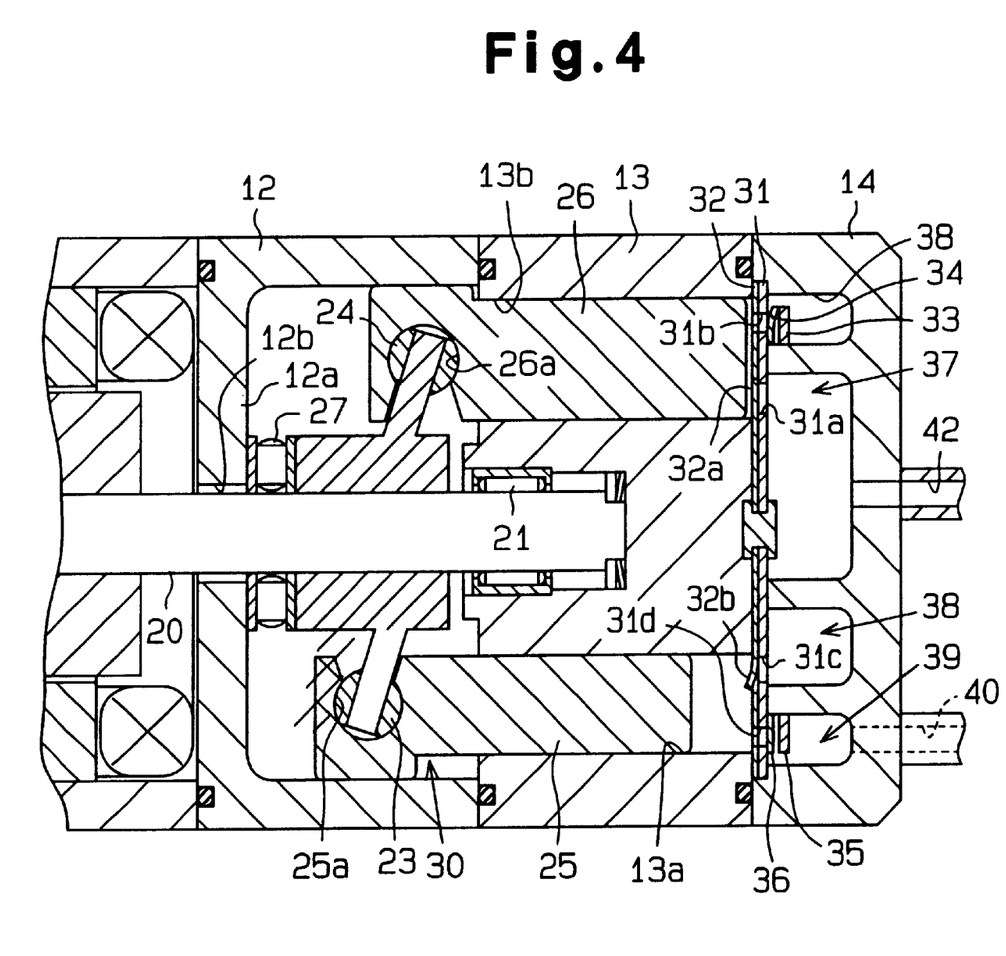
FIG. 4 is cross sectional view taken along line 4—4 of FIG. 3.

FIGS. 2 to 4 show the compressor 10 in cross section. The compressor 10 has a substantially cylindrical configuration. The compressor 10 has four housing components: a motor housing component 11, a front housing component 12, a cylinder block 13 and a rear housing component 14. The motor housing component 11 and the front housing component 12 have hollow cylindrical configurations that are closed at one end. The cylinder block 13 includes a solid body in which a plurality of cylinder bores are formed. The rear housing component 14 includes a solid body having an intake chamber and an exhaust chamber. The motor housing component 11, the front housing component 12, the cylinder block 13 and the rear housing component 14 are connected to one another by a plurality of connecting bolts, and adjacent components are sealed with an O-ring.

A motor chamber 29 is formed within a space defined by the motor housing component 11 and an end wall 12a of the front housing component 12. A crank chamber 30 is formed within a space formed by the front housing component 12 and the cylinder block 13.

As shown in FIGS. 2 and 3, the cylinder block 13 has a first pair, or set, of cylinder bores 13a, 13b, first pair of pistons 25, 26 and an intermediate chamber 38 connecting the cylinder bores 13a, 13b of the first pair set. The cylinder block 13 has a second pair of cylinder bores 113a, 113b, a second pair of pistons 125, 126 and an intermediate chamber 138 connecting these cylinder bores 113a, 113b of the second pair.

As best seen in FIG. 3, one of the cylinder bores 13a, 113a in each pair is smaller in diameter than the other cylinder bores 13b, 113b in each pair. Similarly, there is a pair of small pistons 25, 125 and a pair of large pistons 26, 126. The small pistons 25, 125 are located in the small cylinder bores 13a, 113a, respectively, and the large pistons 26, 126 are located in the large cylinder bores 13b, 113b, respectively. All the pistons are driven by a drive mechanism that includes a drive shaft 20 and a swash plate 22, which are shown in FIG. 2.

An electric motor 17 is incorporated in the motor chamber 29 and includes a rotor 15, and a stator 16. The drive shaft 20 extends through a bore 12b of the end wall 12a of the front housing 12. One end of the drive shaft 20 is supported by a bearing 18 located in an end wall of the motor housing component 11. The rotor 15 is fixed to the drive shaft 20 in radial alignment with the stator 16. The other end of the drive shaft 20 is supported by a radial bearing 21 located in the cylinder block 13.

The swash plate 22 is located in the crank chamber 30. The swash plate 22 has a boss fixed to the drive shaft 20 and a disc integrally formed with the boss. The disc is inclined relative to the rotational axis of the drive shaft 20. A thrust bearing 27 is placed between the boss of the swash plate 22 and the end wall 12a of the front housing 12.

The periphery of the swash plate 22 is connected to the pistons 25, 26, 125, 126. The pistons 25, 26 have, at one end, semi-spherical recesses 25a, 26a, in which semi-spherical shoes 23, 24 are located, respectively. Likewise, the pistons 125, 126 have identical semi-spherical recesses 126a, 125a. In FIGS. 2 and 3, only the semi-spherical recess 126a is shown. A pair of semi-spherical shoes 124 are located in the semi-spherical recess 126a. The piston 125 has a similar semi-spherical recess, in which a pair of shoes are located. The outer periphery of the swash plate 22 is located between and slides with respect to the shoes. As a result, when the drive shaft 20 rotates, the swash plate 22 rotates and produces rocking movement in the longitudinal direction such that the pistons 25, 26, 125, 126 reciprocate with a given stroke, which is determined by the inclination of the swash plate 22.

For example, when the swash plate 22 begins to rotate from the position shown in FIGS. 2 and 4, the upper piston 26 slides in the cylinder bore 13b from a top dead center position to a bottom dead center position, and the lower piston 126 slides from a bottom dead center position to a top dead center position. The left piston 25 (in FIG. 3) moves in the cylinder bore 13a from a position between the top dead center position and the bottom dead center position toward the bottom dead center position, and the right piston 125 moves (as viewed in FIG. 3) in the cylinder bore 113a from a position between the bottom dead center position to the top dead center position toward the top dead center position.

The rear housing component 14 has an intake chamber 37, and first and second exhaust chambers 39, 139.

As shown in FIG. 3, the intake chamber 37 is formed in the rear housing component 14 such that the top cylinder bore 13b is connected with the bottom cylinder bore 113b. The exhaust chambers 39, 139 are formed in the rear housing component 14 such that they are connected with the cylinder bores 13a, 113a, respectively.

Further, the rear housing 14 includes the first and second intermediate chambers 38, 138. The first intermediate chamber 38 connects the left cylinder bore 13a to the top cylinder bore 13b, and the intermediate chamber 138 connects the right cylinder bore 113a to the bottom cylinder bore 113b. The intake chamber 37 is formed at a central portion of the rear housing component 14, that is, on the axis of the drive shaft 20 such that the exhaust chambers 39, 139 and the intermediate chambers 38, 138 are located around the intake chamber 37.

The intake chamber 37 is connected to the valves 46, 47 of the heat exchanger change-over circuit via the intake port formed in the rear housing 14 and the conduit 42. The exhaust chamber 39 is connected with the valves 48, 49 of the heat exchanger change-over circuit via the exhaust port formed in the rear housing component 14 and the conduit 40. Although not shown, the exhaust chamber 139 is also connected with the valves 48, 49 of the heat exchanger change-over circuit via the exhaust port formed in the rear housing component 14 and the conduit 40. The intake ports of the rear housing 14 and the conduit 42 are connected with one another with pipe joints. Likewise, the exhaust ports of the rear housing component 14 and the conduit 40 are connected with one another with pipe joints.

A valve unit is located between the cylinder block 13 and the rear housing component 14. The valve unit has a port-forming member 31 and an intake-valve forming member 32. The port-forming member 31 and the intake-valve forming member 32 are located between a recess formed in the rear housing component 14 and an end wall of the cylinder block 13. The members 31, 32 close the ends of the cylinder bores 13a, 13b, 113a, 113b.

As best shown in FIG. 3, the port-forming member 31 has ports 31a, 31b, 31c, 31d, 131a, 131b, 131c and 131d. The cylinder bore 13b is connected with the intake chamber 37 via the port 31a and is connected with the intermediate chamber 38 via the port 31b. Likewise, the cylinder bore 13a is connected with the intermediate chamber 38 via the port 31c and is connected with the exhaust chamber 39 via the port 31d. The cylinder bore 113b is connected with the intake chamber 37 via the port 131a and is connected with the intermediate chamber 138 via the port 131b. The cylinder bore 113a is connected with the intermediate chamber 138 via the port 131c and is connected with the exhaust chamber 139 via the port 131d.

As best shown in FIGS. 2 and 4, the intake-valve forming member 32 has intake valves 32a, 32b to open or close the ports 31a, 31c and similar intake valves to open or close the ports 131a, 131c. In FIGS. 2 and 4, only the intake valve 132a for the port 131a is shown.

The exhaust valve 34 includes a leaf valve that opens or closes the port 31b of the cylinder bore 13b. As best shown in FIG. 3, the leaf valve 34 is supported by a retainer 33 and is connected to members 31, 32 with the retainer 33 by pins. As shown in FIG. 4, the exhaust valve 36 that opens or closes the port 31d of the cylinder bore 13a includes a leaf valve and is connected to the members 31, 32 with the retainer 35 by pins. As shown in FIG. 3, further, the exhaust valve 134 includes a leaf valve that opens or closes the port 131b of the cylinder bore 113a and is connected to the members 31, 32 with the retainer 133 by pins. While the exhaust valve that opens or closes the cylinder bore 113a is not shown, the retainers 35,135 are shown in FIG. 3.

The operation of the air conditioning system 50 will now be described below.

When cooling the passenger compartment, the valves 46, 49 are closed, the valves 47, 48 are opened, the valve 56 is closed, the valve 55 is opened and the compressor 10 is operated. In this event, the internal air conditioning coil 51 serves as an evaporator, and the external coil 52 serves as a condenser.

When the compressor 10 is operated, refrigerant stored in the reservoir 57 is drawn to the internal air conditioning coil 51 via the expansion valve 54. Refrigerant is evaporated in the internal air conditioning coil 51 and absorbs heat from air in the passenger compartment, thus cooling the air in the passenger compartment. Subsequently, refrigerant is drawn to the compressor 10 via the valve 47 and the intake conduit 42 and is compressed. Compressed refrigerant flowing from the compressor 10 is conducted through the conduit 40 and the valve 48 to the external coil 52, at which compressed refrigerant is condensed. Condensed refrigerant is returned to the reservoir 57 via valve 55. In this manner, refrigerant is repeatedly circulated in the system during operation of the compressor 10.

When heating in passenger compartment, the valves 46, 49 are opened, the valves 47, 48 are closed and the compressor 10 is operated. Under these conditions, the external coil 52 serves as the evaporator, and the internal air conditioning coil 51 serves as the condenser.

When the compressor 10 is operated, refrigerant stored in the reservoir 57 is drawn through the expansion valve 53 to the external coil 52 and is evaporated. Evaporated refrigerant is then drawn through the valve 46 and the intake conduit 42 to the compressor 10. Compressed refrigerant flowing from the compressor 10 is drawn through the conduit 40 and the valve 49 to the internal air conditioning coil 51. Heat is transferred to the air in the passenger compartment from the internal coil 51. Refrigerant is then circulated through the expansion valve 56 to the reservoir 57. Circulation of refrigerant in the system is repeated during operation of the compressor 10.

During cooling and heating with the air conditioning system, the compressor 10 compresses intake refrigerant in the cylinder bore 13a with the piston 25. Compressed refrigerant is further compressed in the cylinder bore 13b with the piston 26. Simultaneously, compressed refrigerant is compressed in the cylinder bore 113a with the piston 125 and is further compressed in the cylinder bore 113b with the piston 126 in a manner described in detail below.

When the drive shaft 20 is rotated by the electric motor 17, the swash plate 22 rotates such that all the pistons 26, 25, 126, 125 of the cylinder bores 13b, 13a, 113b, 113a are caused to reciprocate. Under these conditions, the swash plate 22 converts rotational motion of the drive shaft 20 to linear motion of the pistons 25, 26, 126, 125.

Assume that the rotational angle of the swash plate 22 is zero degrees when the piston 26 of the cylinder bore 13b, is at the top dead center position, which is shown in FIG. 2. As the swash plate 22 rotates by an angle of 180 degrees, the piston 26 of the cylinder bore 13b moves toward a bottom dead center position, and the piston 126 of the opposite cylinder bore 113b moves toward the top dead center position.

After the swash plate 22 rotates from zero to degrees an angle of 90 degrees, the piston 25 of the cylinder bore 13a is located at the top dead center position, and the piston 125 of the opposite cylinder 113a is located at the bottom dead center position. As the swash plate 22 further rotates by an angle of 180 degrees, the piston 25 of the of the cylinder bore 13a is located at the bottom dead center position, and the piston 125 of the opposite cylinder bore 113a is located at the top dead center position.

As a result, when the swash plate 22 rotates by 180 degrees from the initial position of FIG. 2, the piston 26 draws refrigerant through the intake conduit 42, the intake chamber 37 and the intake valve 31a. Simultaneously, compressed refrigerant is exhausted from the cylinder bore 113b into the intermediate chamber 138. When the swash plate 22 rotates by an another of 180 degrees, refrigerant is exhausted from the cylinder bore 13b by the piston 26 into the intermediate chamber 38. Simultaneously, refrigerant is drawn through the intake conduit 42, the intake chamber 37 and the intake port 131a into the cylinder bore 113b.

After the swash plate 22 rotates between an angle of 90 degrees and 270 degrees from the zero position of FIG. 2, the piston 25 begins compressed refrigerant from the intermediate chamber 38, and compressed refrigerant is discharged into the exhaust chamber 139 from the cylinder bore 113a. As the swash plate 22 rotates by another 180 degrees (between an angle of 270 degrees and 90 degrees), re-compressed refrigerant is discharged into the exhaust chamber 39 from the bore 13a, and the opposite piston 25 draws compressed refrigerant from the intermediate chamber 138.

Figure 5:
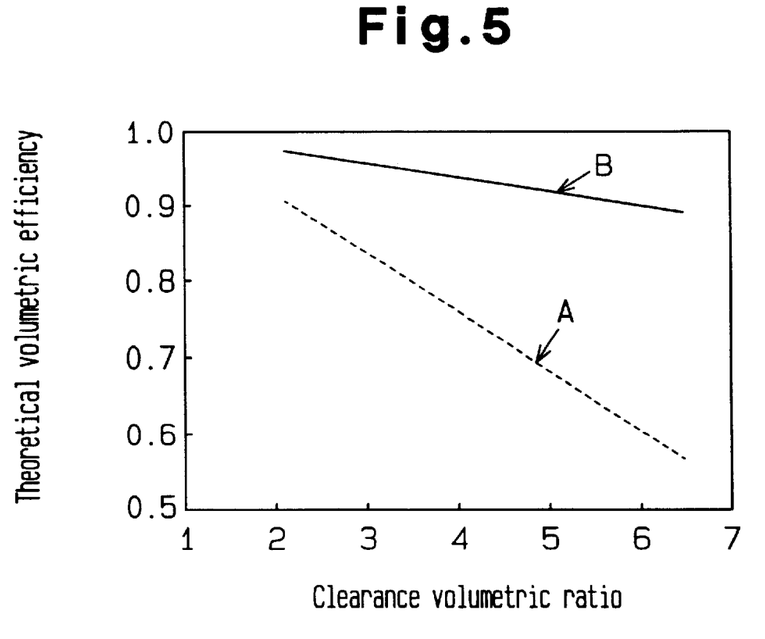
FIG. 5 is a graph illustrating the relationship between the compression ratio and the theoretical volumetric efficiency of the compressor.

FIG. 5 shows a graph illustrating relationships between compression ratio and theoretical volumetric efficiency for a prior art compressor (curve A) and the compressor of this embodiment (curve B).

The compression ratio (exhaust pressure Pd/intake pressure Ps) of the swash type compressor varies in dependence on the atmospheric temperature. According to convention, when the refrigerant includes carbon dioxide, the compression ratio for cooling is selected to be in a range from 2 to 4, and the compression ratio for heating is in a range from 3 to 6. Thus, to perform both cooling and heating with the use of a single stage swash type compressor, the compressor should operate with the compression ratio in a wide range between 2 and 6.

In a conventional single stage compressor, when the compression ratio varies from 2 to 6, the theoretical volumetric efficiency is lowered from 0.9 to 0.6 as shown by a curve A.

In the multi-stage compressor 10 of the present invention, theoretical volumetric efficiency relative to the compression ratio is higher than that shown by curve A and varies on a gentle slope as shown by curve B. This is due to the fact that refrigerant is first compressed in the cylinder bores 13b, 113b by the pistons 26 and 126, and, thereafter, is further compressed in the cylinder bores 13a, 113a by the pistons 25 and 125 such that the reduction in the theoretical volumetric efficiency relative to the compression ratio is gradual. The compressor 10 of the present invention has a theoretical volumetric efficiency of about 0.9 with a high compression ratio of 6, which is highly efficient for heating.

Figure 6:
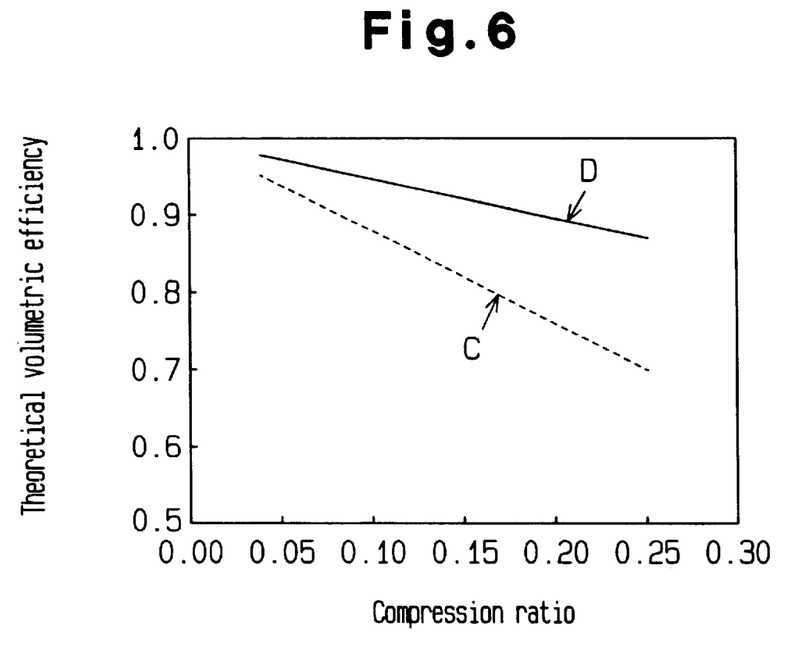
FIG. 6 is a graph illustrating the relationship between the dead volume and the theoretical volumetric efficiency of the compressor.

FIG. 6 shows a graph illustrating the clearance volumetric ratio in relation to theoretical volumetric efficiency for a conventional compressor (curve C) and the compressor of the present invention (curve D).

In swash plate type compressor, as the volume of the compressor decreases, the clearance volumetric ratio (namely, the ratio of dead volume to piston stroke volume) increases and the theoretical volumetric ratio decreases.

In a conventional single stage compressor, the theoretical volumetric efficiency rapidly decreases as the clearance volumetric ratio increases as shown by a curve C. Thus, it is difficult to make a small, efficient compressor.

In the multi-stage compressor 10, the theoretical volumetric efficiency relative to the clearance volumetric ratio is at a level higher than that of curve C and varies gradually as shown by curve D. Since refrigerant is first compressed in the cylinder bores 13b, 113b by the pistons 26, 126 and is further compressed in the cylinder bores 13a, 113a by the pistons 25 and 125, reduction in the theoretical volumetric efficiency relative to the clearance volumetric ratio is gradual. Consequently, the compressor can be small and have a high efficiency, even when the clearance volumetric ratio increases.

The vehicle air conditioning system of the present invention is advantageous over the prior art for the following reasons:

Since refrigerant is highly pressurized in a multi-stage fashion by the compressor 10, the compressor 10 has a volumetric efficiency ranging in a high compression ratio required for air cooling or air heating of the system, resulting in a highly sophisticated air cooling or air heating performance with reduced power consumption.

Since the compressor 10 compresses refrigerant in a plurality of stages, the volumetric efficiency falls gradually when the clearance volumetric ratio increases. In other words, even when the compressor 10 is small, the volumetric efficiency of the compressor 10 is scarcely reduced. As a result, the air conditioning system can be small and can occupy minimal space in the vehicle.

Even when the compressor 10 employs refrigerant that includes carbon dioxide, which requires high pressure, the refrigerant has full cooling or heating performance.

Since the compressor 10 has the intake chamber 37, which is located on the axis of the drive shaft 20, or, in the vicinity of a center line of the compressor 10 such that the exhaust chambers 39, 139 and the intermediate chambers 38, 138 are located around the intake chamber 37, the compressor 10 is compact and small.

It should be apparent to those skilled in the art that the present invention may be embodied in many other forms without departing from the spirit or scope of the invention. Particularly, it should be understood that the invention may be embodied in the following forms.

In the illustrated embodiments, although the compressor has been shown and described as a fixed volume type compressor with a fixed piston stroke, the compressor may be modified to be a variable displacement type compressor having a variable piston stroke. Although the compressor has been shown and described as having a swash plate, the swash plate may be replaced with a wave cam.

While, in the illustrated embodiments, the compressor is arranged to compress refrigerant in two stages in which pressure losses are minimized and compression ratio is maintained at a sufficient level, the compressor may be modified such that refrigerant is further compressed to meet desired purposes. However, if the compressor is arranged to have additional compression stages, refrigerant pressure losses occur due to additional valves that are required.

While, in the illustrated embodiments, the compressor has been shown and described as including two of cylinder bore pairs, the compressor may be modified such that more than two cylinder bore pairs are formed or such that only one cylinder bore pair is formed in the compressor.

While, in the illustrated embodiments, refrigerant has been described as including carbon dioxide, refrigerant may include other refrigerant such as ammonia or propane gases.

What is claimed is:

1. An air conditioning apparatus used for a vehicle, the apparatus comprising:

a compressor, wherein the compressor includes:
a first cylinder bore;
a second cylinder bore, wherein the second cylinder bore is smaller in diameter than the first cylinder bore;
a first piston located in the first cylinder bore;
a second piston located in the second cylinder bore;
an intermediate chamber connecting the first and second cylinder bores to one another;

a suction chamber connected to the first cylinder bore;

a discharge chamber connected to the second cylinder bore;

a drive mechanism for driving the first and second pistons;

a first intake valve for conducting refrigerant from the suction chamber to the first cylinder bore;

a first exhaust valve for conducting refrigerant from the first cylinder bore to the intermediate chamber;

a second intake valve for conducting refrigerant from the intermediate chamber to the second cylinder bore; and a second exhaust valve for conducting refrigerant from the second cylinder bore to the discharge chamber, wherein the compressor has a clearance volumetric ratio that is greater than 0.05;

an internal heat exchanger located in a passenger compartment of the vehicle, wherein the internal heat exchanger has first and second ends;

an external heat exchanger located outside the passenger compartment, wherein the external heat exchanger has first and second ends;

a heat exchanger change-over circuit including:

a cooling passage, by which the suction chamber of the compressor is connected to the first field of the internal heat exchanger and by which the discharge chamber is connected to the first end of the external heat exchanger; and a heating passage, by which the discharge chamber of the compressor is connected to the first end of the internal heat exchanger and by which the suction chamber is connected to the first end of the external heat exchanger, wherein the cooling passage is blocked and the heating passage is open during a heating operation, and the heating passage is blocked and the cooling passage is open during a cooling operation; and an expansion valve change-over circuit including:

a heating expansion passage to expand refrigerant flowing from the internal heat exchanger; and a cooling expansion passage to expand refrigerant flowing from the external heat exchanger, wherein the heating expansion passage is open and the cooling expansion passage is closed during the heating operation, and the cooling expansion passage is open and the heating expansion passage is closed during the cooling operation.

2. An air conditioning apparatus according to claim 1, wherein the drive mechanism includes:

a drive shaft; and a swash plate fixed to the drive shaft and inclined relative to a rotational axis of the drive shaft for converting rotational motion of the drive shaft to a linear motion in the pistons.

3. An air conditioning apparatus according to claim 1, wherein the first and second cylinder bores form a first pair of cylinder bores, and the first and second pistons form a first pair of pistons, and the compressor further includes:

a second pair of cylinder bores that is substantially identical to the first pair, wherein a first cylinder bore of the second pair is connected to the suction chamber and a second cylinder bore of the second pair is connected to the discharge chamber;

a second pair of pistons, which are respectively located in the bores of the second pair of bores, wherein the drive mechanism drives all the pistons;

an intermediate chamber of the second pair of bores, which is connected to the first and second cylinder bores of the second pair;

a first intake valve of the second pair of bores for conducting refrigerant from the suction chamber to the first cylinder bore of the second pair of bores;

a first exhaust valve of the second pair of bores for conducting refrigerant from the first cylinder bore of the second pair to the intermediate chamber of the second pair of bores;

a second intake valve of the second pair of bores for conducting refrigerant from the intermediate chamber of the second pair of bores to the second cylinder bore of the second pair of bores; and a second exhaust valve of the second pair of bores for conducting refrigerant from the second cylinder bore of the second pair of bores to the discharge chamber.

4. An air conditioning apparatus according to claim 3, wherein the drive mechanism includes:

a drive shaft; and a swash plate fixed to the drive shaft and inclined relative to a rotational axis of the drive shaft for converting rotational motion of the drive shaft to a linear motion in the pistons.

5. An air conditioning apparatus according to claim 4, wherein the suction chamber is intersected by the rotational axis of the drive shaft and the discharge chamber and the intermediate chambers are located outward in a radial direction from the suction chamber.

6. An air conditioning apparatus according to claim 3, wherein the compressor is constructed to have a compression ratio in a range of 2 to 6.

7. An air conditioning apparatus according to claim 1, wherein the refrigerant includes carbon dioxide.

8. An air conditioning apparatus according to claim 1, wherein the heating expansion passage includes a heating expansion valve, which is bypassed during the cooling operation, and the cooling expansion passage includes a cooling expansion valve, which is bypassed during the heating operation.

* * * * *

UNITED STATES PATENT AND TRADEMARK OFFICE
CERTIFICATE OF CORRECTION

PATENT NO. : 6,467,296 B2
DATED : October 22, 2002
INVENTOR(S) : Toshiro Fujii et al.

It is certified that error appears in the above-identified patent and that said Letters Patent is hereby corrected as shown below:

<u>Column 9,</u>
Line 26, please delete "field" and insert therefor -- end --

Signed and Sealed this

Eleventh Day of March, 2003

JAMES E. ROGAN
*Director of the United States Patent and Trademark Office*